US010221069B2

(12) United States Patent
Rashidi et al.

(10) Patent No.: US 10,221,069 B2
(45) Date of Patent: Mar. 5, 2019

(54) PRODUCING GRAPHENE AND NANOPOROUS GRAPHENE

(71) Applicant: Research Institute of Petroleum Industry, Tehran OT (IR)

(72) Inventors: Alimorad Rashidi, Tehran (IR); Leila Mahmudian, Tehran (IR); Hossein Dehghani, Kashan (IR)

( * ) Notice: Subject to any disclaimer, the term of this patent is extended or adjusted under 35 U.S.C. 154(b) by 423 days.

(21) Appl. No.: 14/931,609

(22) Filed: Nov. 3, 2015

(65) Prior Publication Data

US 2016/0060123 A1 Mar. 3, 2016

Related U.S. Application Data

(60) Provisional application No. 62/074,107, filed on Nov. 3, 2014.

(51) Int. Cl.
| | |
|---|---|
| *B01J 21/18* | (2006.01) |
| *C01B 31/04* | (2006.01) |
| *B01J 20/20* | (2006.01) |
| *C01B 32/184* | (2017.01) |

(52) U.S. Cl.
CPC ......... *C01B 31/0446* (2013.01); *B01J 20/205* (2013.01); *C01B 32/184* (2017.08); *C01B 2204/32* (2013.01)

(58) Field of Classification Search
CPC .... B01J 20/205; C01B 32/182; C01B 32/184; C01B 32/194
USPC .................................. 502/182–184; 977/734
See application file for complete search history.

(56) References Cited

U.S. PATENT DOCUMENTS

| | | | | |
|---|---|---|---|---|
| 8,202,817 B2* | 6/2012 | Yuge | ...................... | B01J 21/185 423/445 R |
| 9,631,148 B2* | 4/2017 | Worsley | ................. | C10G 47/12 |
| 2010/0044733 A1 | 2/2010 | Okabe et al. | | |
| 2013/0116114 A1 | 5/2013 | Nguyen | | |
| 2013/0230709 A1* | 9/2013 | Zhou | ...................... | H01G 11/36 428/219 |
| 2014/0183415 A1* | 7/2014 | Song | ...................... | B82Y 30/00 252/502 |
| 2017/0051078 A1* | 2/2017 | Tang | ......................... | D01F 2/08 |
| 2018/0037460 A1* | 2/2018 | Fu | ......................... | C01B 32/184 |

OTHER PUBLICATIONS

Ru-Juan Mo et al., "Graphene-like porous carbon fro sheet cellulose as electrodes for supercapacitors." Chemical Engineering Journal 346, pp. 104-112. (Year: 2018).*
Leila Mahmoudian et al., "Single-step scalable synthesis of three-dimensional highly porous graphene with favorable methane adsorption." Chemical Engineering Journal 304, pp. 784-792. (Year: 2016).*

(Continued)

*Primary Examiner* — Patricia L. Hailey
(74) *Attorney, Agent, or Firm* — Bajwa IP Law Firm; Haris Zaheer Bajwa (57) ABSTRACT

A method for producing nanoporous graphene includes steps of preparing cellulosic raw materials; impregnating the prepared raw materials with a catalyst; activating the impregnated cellulosic raw materials; heating the activated cellulosic raw materials in a heating system to create nanoporous graphene; and washing the nanoporous graphene to remove impurities.

22 Claims, 5 Drawing Sheets

(56) References Cited

OTHER PUBLICATIONS

Leila Ekhlasi et al., "Populus wood biomass-derived graphene for high CO2 capture at atmospheric pressure and estimated cost of production." Process Safety and Environmental Protection 113, pp. 97-108. (Year: 2017).*

P. Gonzalez-Garcia, "Activated carbon from lignocellulosics precursors: A review of the synthesis methods, characterization techniques and applications." Renewable and Sustainable Energy Reviews 82, pp. 1393-1414. (Year: 2018).*

Hiroyuki Muramatsu, Rice Husk-Derived Graphene with Nano-Sized Domains and Clean Edges, Small , Jul. 2014, vol. 10, Issue 14, pp. 2766-2770.

Subash Sharma, Synthesis of graphene crystals from solid waste plastic by chemical vapor deposition, Carbon, Jun. 2014, vol. 72, pp. 66-73.

Santosh H. Vijapur, Raw Coal Derived Large Area and Transparent Graphene Films, ECS Solid State Letters, 2013, vol. 2, Issue 7, pp. M45-M47.

Zhancheng Li, Low-Temperature Growth of Graphene by Chemical Vapor Deposition Using Solid and Liquid Carbon Sources, ACS nano, 2011, vol. 5, Issue 4, pp. 3385-3390.

* cited by examiner

PRODUCING GRAPHENE AND NANOPOROUS GRAPHENE

CROSS REFERENCE TO RELATED APPLICATION

The present application claims the benefit of priority from U.S. Provisional Patent Application Ser. No. 62/074,107, filed on Nov. 3, 2014, and entitled "Production of Graphene and Nanoporous Graphene with High Surface Area from Cellulosic Materials Using a Supported Catalyst", which is incorporated by reference herein in its entirety.

SPONSORSHIP STATEMENT

This application has been sponsored by the Iranian Nanotechnology Initiative Council (INIC), which does not have any rights in this application.

TECHNICAL FIELD

The present application generally relates to the production of graphene and nanoporous graphene, and more specifically to a simple method for the production of graphene and nanoporous graphene, and even more specifically to the application of as-prepared graphene and as-prepared nanoporous graphene in natural gas storage.

BACKGROUND

Graphene is a two-dimensional allotrope of carbon, commonly referred to as monolayer graphite. The structure of graphene is a single atom thick planar sheet of sp2-bonded carbon atoms that are packed in a honeycomb crystal lattice. Graphene has various specific properties owning to its ideal two-dimensional structure, including, for example, high conductivity, and high electron mobility. Properties of graphene, such as inelastic electron conductivity and spin transport, mechanical strength, light absorption and emission, and heat conduction, have also attracted interest.

Thickness, lateral size, defects, impurity contents, stacking order, surface chemistry, and edge geometry of graphene are important factors, which determine the superb combined properties of graphene, especially its overall electronic, magnetic, optical and catalytic properties.

At present, various methods for producing graphene are known, including methods, such as, exfoliation of graphite, solid-phase reduction and vapor-phase growth methods. In the solid-phase reduction method, silicon carbide crystals are subjected to a vacuum heat treatment to evaporate the surface Si element, which is called silicon sublimation, and form a graphene crystal layer on a silicon carbide surface. In the vapor-phase growth method, the raw material hydrocarbon gas is fed to grow a graphene film on a crystal surface of a metal, such as nickel or iron, using a thermal chemical vapor deposition (CVD) method.

Most of the carbon sources used in the abovementioned methods, are purified chemicals, which are expensive for mass production. This is a known drawback of the solid-phase reduction and the vapor-phase growth methods. In fact, the CVD method provides large crystalline graphene sheets, but this approach is largely inapplicable to bulk production, because it requires a catalytic thin film made of metallic substrates, such as copper, nickel, molybdenum, etc., which makes this process very expensive, and therefore, undesirable for large scale production.

Moreover, in methods utilizing metal foils, such as the aforementioned CVD method, the amount of graphene, which is produced is limited by the area of the starting substrate/foil. Additionally, chemical vapor deposition on foils has limited application, where a continuous film is required.

Exfoliation or chemical reduction of graphite oxides is another method for producing graphene in a scalable manner; however, the use of toxic chemical agents, as well as complex processing, inhibits the scaling up of such processes. Compared with other techniques, chemical exfoliation, which involves the direct exfoliation of various solid starting materials, such as graphite oxide, expanded graphite and natural graphite, is advantageous in terms of simplicity, cost and high volume production. However, currently explored chemical solution exfoliation methods have a number of drawbacks that need to be addressed. Hence, there is a need for a cost-effective and environmental friendly method with milder operating conditions for mass production of graphene and nanoporous graphene. There is also a need for a method to produce nanoporous graphene with a high surface area, small pore size, and large pore volume.

SUMMARY

The following brief summary is not intended to include all features and aspects of the present application, nor does it imply that the application must include all features and aspects discussed in this summary.

In one general aspect, the instant application describes a method for producing graphene and nanoporous graphene from cellulosic raw materials, and more specifically the instant application introduces an environmental friendly and cost-effective method for producing graphene and nanoporous graphene with a high specific surface area.

In this disclosure, a method is introduced for producing graphene from cellulosic raw materials, which contain a high percentage of metals, such as, nickel (Ni), zinc (Zn), silicon (Si), magnesium (Mg), copper (Cu), and potassium (K). The method has three steps of: first, preparing the cellulosic raw materials by washing and then grinding the cellulosic raw materials to obtain a powder with a suitable average particle size; second, heating the prepared cellulosic raw materials in a heating system, which could be for example a furnace. The heating process includes a heating ramp from the ambient temperature to a final treatment temperature with a suitable temperature step, and then heating the prepared cellulosic raw materials in the final treatment temperature for a specific amount of time and then cooling the heating system to the ambient temperature; finally, washing the resultant product from the second step to obtain a product, which is pure graphene.

In another implementation, a method is introduced for producing graphene from cellulosic raw materials. The method includes the following steps: first, preparing cellulosic raw materials by washing and grinding the cellulosic raw materials to obtain a powder with a suitable average particle size; second, impregnating the prepared cellulosic raw materials with a catalyst; third, heating the impregnated cellulosic raw materials in a heating system, which could be for example a furnace. The heating process includes a heating ramp from the ambient temperature to a final treatment temperature with a suitable temperature step, and then heating the impregnated cellulosic raw materials in the final treatment temperature for a specific amount of time and then cooling the heating system to the ambient temperature;

finally, washing the resultant product from the third step to obtain a product, which is pure graphene.

According to another implementation of the present application, a method is introduced for producing nanoporous graphene from cellulosic raw materials. The method includes the steps of: first, preparing the cellulosic raw materials by washing and grinding the cellulosic raw materials to obtain a powder with a suitable average particle size; second, impregnating the prepared cellulosic raw materials with a catalyst; Third, activating the impregnated cellulosic raw materials with an alkali metal hydroxide; fourth, heating the activated cellulosic raw materials in a heating system, which could be for example a furnace. The heating process includes a heating ramp from the ambient temperature to a final treatment temperature with a suitable temperature step, and then heating the activated cellulosic raw materials in the final treatment temperature for a specific amount of time and then cooling the heating system to the ambient temperature; finally, washing the resultant product from the third step to obtain a product, which is pure nanoporous graphene.

In some implementations, the impregnation and the activation steps or stages can be carried out simultaneously.

The catalyst can include metals, such as, magnesium (Mg), aluminum (Al), silicon (Si), molybdenum (Mo), tungsten (W), nickel (Ni), copper (Cu), zinc (Zn), titanium (Ti), etc., or the catalyst can include metal oxides, such as, MgO, ZnO, CuO, $SiO_2$, $WO_3$, $MoO_3$, $TiO_2$, etc. Different metal salts, such as, nitrates, acetates, sulfates, and etc. can also be used to synthesize the catalyst.

The catalyst can be a copper (II) hydroxide carbonate solution or a copper (II) acetate solution.

The activation step can be carried out in a heating system, such as a furnace. In this implementation instead of activating the impregnated cellulosic raw materials with an alkali metal hydroxide solution, the impregnated cellulosic raw materials can be mixed with the alkali metal hydroxide in the solid phase, and then the solid mixture is put inside the heating system or the furnace, allowing the alkali metal hydroxide to melt. In this implementation, the impregnated cellulosic raw materials are activated with the molten alkali metal hydroxide.

The impregnated cellulosic raw materials are activated using a KOH solution.

In another aspect of the present application, a nanoporous graphene structure is synthesized via the method introduced in the present application with a high specific surface area, suitable for the applications, such as, gas storage.

BRIEF DESCRIPTION OF THE DRAWINGS

While the specification concludes with claims particularly pointing out and distinctly claiming the subject matter that is regarded as forming the present application, it is believed that the application will be better understood from the following description taken in conjunction with the accompanying DRAWINGS, where like reference numerals designate like structural and other elements, in which:

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, and/or components, have been described at a relatively high-level, without detail, in order to avoid unnecessarily obscuring aspects of the present teachings.

In one implementation, the present application discloses an environmental friendly and cost-effective method for mass production of graphene and nanoporous graphene. This method enables mass production of graphene under easier operating conditions. This method allows the production of nanoporous graphene with a high surface area, suitable for applications, such as methane and hydrogen storage. The nanoporous graphene may be produced by modifying the graphene created using the method of the instant application.

The method described herein, may use non-expensive and abundantly available raw materials, and may have simpler operating conditions compared to conventional methods. These and other characteristics of the method introduced in the present application may make it a suitable method for the mass production of graphene and nanoporous graphene.

Cellulosic raw materials that contain a high percentage of metals, such as, nickel (Ni), zinc (Zn), silicon (Si), magnesium (Mg), copper (Cu), and potassium (K), can be directly used for the production of graphene, without being impregnated with a catalyst solution, which is a common practice in the art.

The method for producing graphene in the instant application may include three steps: first, preparing the cellulosic raw materials by washing the cellulosic raw materials with distilled water, and then grinding the cellulosic raw materials to obtain a powder with, for example, a preferred average particle size of about 100 to about 320 mesh. The second step may include the thermal treatment of the powder obtained from the first step. This step may be called the heating step. To this end, the powder is put inside a heating system, such as a furnace.

Inside the heating system, the temperature may be increased from the ambient temperature to a final treatment temperature with preferred temperature steps of about 5° C. per minute. In some implementations, the final treatment temperature is preferably between 700° C. and 1100° C., and more preferably between 850° C. and 900° C., and even more preferably about 900° C. The temperature in the heating system is then, maintained at this final treatment temperature for preferably about 1 to 2 hours, and more preferably for 1 hour, and finally the temperature is reduced to the ambient temperature. The resultant product of this step is graphene along with some impurities.

In the third and final step of the method, the resultant product of the second step may be washed to remove the impurities from the resultant graphene. The washing process may have two stages, namely, washing the resultant product with an acid solution to remove the impurities, and then, washing the resultant graphene with distilled water several times. The product, which is purified graphene, can then, be filtered and dried overnight. In some implementations, hydrochloric acid (HCl) with a preferred concentration of about 5M, can be used to wash the resultant product, and the subsequent washing with distilled water is carried out to remove the chloride ions. In some implementations, the resultant graphene can be washed with an HCl solution, and then, in order to remove the chloride ions, the resultant graphene is washed with distilled water several times, and after that, the graphene is washed with another acid solution, which could preferably be a nitric acid solution, and finally the purified graphene can be rinsed with distilled water.

The aforementioned three-step method can be modified for the use of cellulosic raw materials, which do not contain a high percentage of metal impurities. In this modified method, after washing and grinding the cellulosic raw materials, and obtaining a powder with a suitable average particle size, the obtained powder may then be impregnated with a catalyst. According to one implementation, the impregnation can be carried out by immersing the powder of cellulosic raw materials in a catalyst solution, and then, evaporating the water in the mixture of cellulosic raw materials and the catalyst solution to obtain a powder of cellulosic raw materials impregnated with the catalyst. It should be understood to those skilled in the art that other methods, such as hydrothermal method and precipitation method can also be used to incorporate the catalyst into the raw materials.

The catalyst, which is used in the aforementioned impregnation of the cellulosic raw materials, can include metals, such as, magnesium (Mg), aluminum (Al), silicon (Si), molybdenum (Mo), tungsten (W), nickel (Ni), copper (Cu), zinc (Zn), titanium (Ti), etc., or the catalyst can include metal oxides, such as, MgO, ZnO, CuO, $SiO_2$, $WO_3$, $MoO_3$, $TiO_2$, etc. Different metal salts, such as, nitrates, acetates, sulfates, and etc. can be used to synthesize the catalyst. In some implementations, the preferred concentration of the catalyst solution is between about 2 wt % and about 20 wt %.

In the next step, the impregnated cellulosic raw materials, which are in the form of a powder, may be placed inside a heating system, which could be, for example a furnace. The temperature of the heating system may then be increased from the ambient temperature to a final treatment temperature with temperature steps of about 5° C. per minute. In some implementations, the final treatment temperature is preferably between 700° C. and 1100° C., and more preferably between 850° C. and 900° C., and even more preferably about 900° C. The temperature in the heating system may then be maintained at this final treatment temperature for preferably about 1 to 2 hours, and more preferably for 1 hour, and finally the temperature may be reduced to the ambient temperature. The resultant product of this step is graphene along with some impurities.

In the final step of the method, the resultant product of the previous step may be washed to remove the impurities from the resultant graphene. The washing process may have two stages, namely, washing the resultant product with an acid solution to remove the impurities, and then, washing the resultant graphene with distilled water several times. The product, which may be purified graphene, can then, be filtered and dried overnight. In some implementations, HCl with a preferred concentration of about 5M, can be used to wash the resultant product, and the subsequent washing with distilled water can be carried out to remove the chloride ions. In some implementations, the subsequent washing with distilled water may be carried out several times, and after that, the graphene may be washed with another acid solution, which could be a nitric acid solution, and finally the purified graphene can be rinsed with distilled water.

In another aspect of the present application, the aforementioned methods can be further modified for the production of nanoporous graphene. In this aspect, the impregnated cellulosic raw materials are further activated with an alkali metal hydroxide, such as KOH, before the heat treatment stage in the heating system or furnace.

Figure 1:
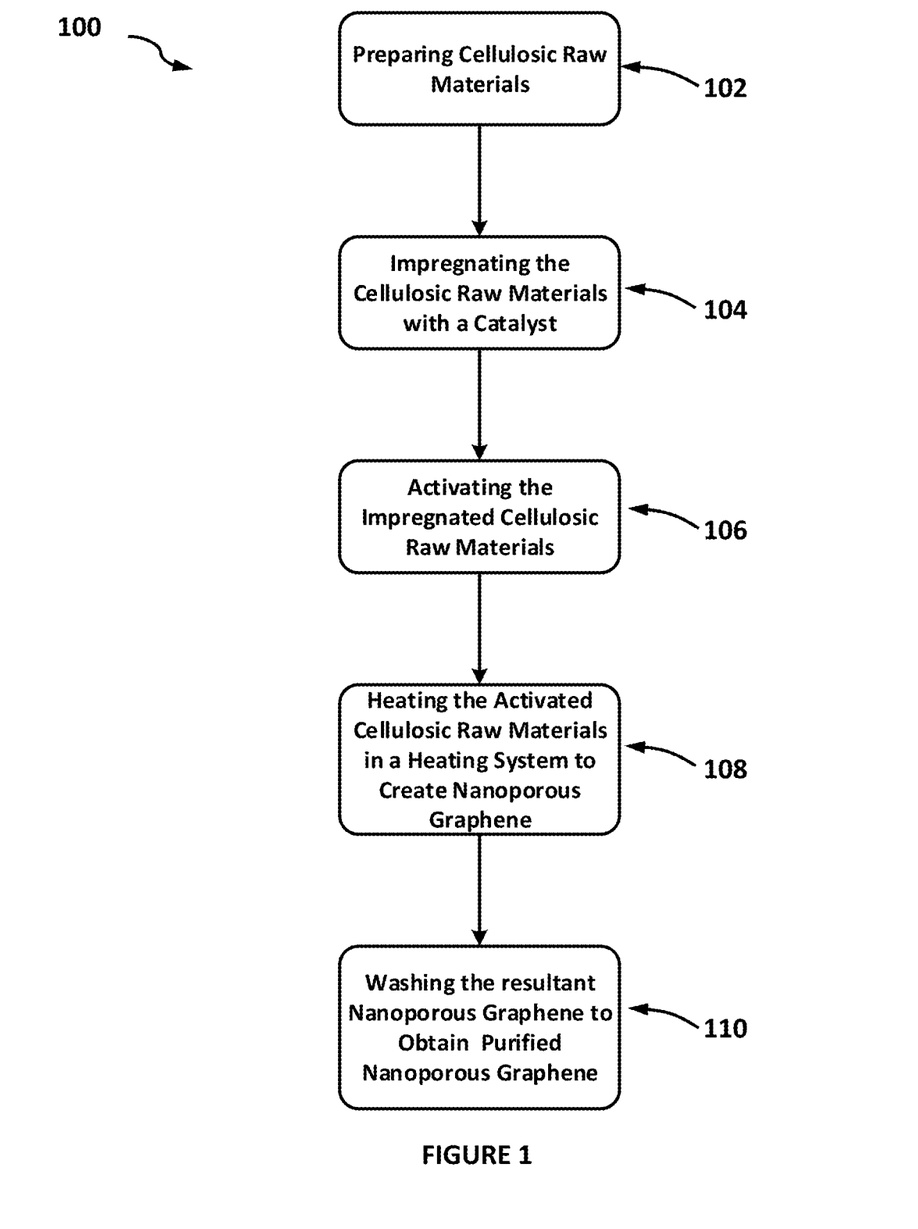
FIG. 1 is an exemplary and non-limiting method for producing nanoporous graphene.

FIG. 1 illustrates an exemplary method 100 for producing nanoporous graphene according to one implementation. The method 100 begin with preparing the cellulosic raw materials (step 102). The preparing the cellulosic raw materials, the cellulosic raw materials may be washed and grinded to obtain a powder with a suitable average particle size. The obtained powder may then be impregnated with a catalyst (step 104).

According to one implementation, impregnating the obtained powder with a catalyst (step 104) can be carried out by immersing the powder of cellulosic raw materials in a catalyst solution, and then, evaporating the water in the mixture of cellulosic raw materials and the catalyst solution. It should be understood to those skilled in the art that other methods, such as hydrothermal method and precipitation method can also be used to incorporate the catalyst into the raw materials.

The catalyst, which is used in the aforementioned impregnation of the cellulosic raw materials, can include metals, such as, magnesium (Mg), aluminum (Al), silicon (Si), molybdenum (Mo), tungsten (W), nickel (Ni), copper (Cu), zinc (Zn), titanium (Ti), etc., or the catalyst can include metal oxides, such as, MgO, ZnO, CuO, $SiO_2$, $WO_3$, $MoO_3$, $TiO_2$, etc. Different metal salts, such as, nitrates, acetates, sulfates, and etc. can be used to synthesize the catalyst. In some implementations, the preferred concentration of the catalyst solution is between about 2 wt % and about 20 wt %.

In the next step of method 100, the impregnated cellulosic raw materials, which are in the form of a powder, are activated using an alkali metal hydroxide (step 106). The activation can be carried out by mixing the impregnated cellulosic raw materials with the alkali metal hydroxide solution, and then evaporating the water in the resultant mixture. Alternatively, the activation can be carried out by mixing the impregnated cellulosic raw materials with the alkali metal hydroxide to obtain a powder, and then heating the obtained powder at the melting temperature of the alkali metal hydroxide, and subsequently activate the cellulosic raw materials with the molten alkali metal hydroxide. The alkali metal hydroxide, which, for example can be KOH, is mixed with the impregnated cellulosic raw materials with a preferred ratio between (1:1) and (5:1). In some implementations the impregnation step (step 104) and the activation step (step 106) can be carried out simultaneously.

In the next step of method 100, the activated cellulosic raw materials, which are in the form of a powder, may be placed inside a furnace (step 108). The temperature of the furnace may be increased from the ambient temperature to a final treatment temperature with temperature steps of about 5° C. per minute. In some implementations, the final treatment temperature is preferably between 700° C. and 1100° C., and more preferably between 850° C. and 900° C., and even more preferably about 900° C. The temperature in the furnace may then be maintained at this final treatment temperature for preferably about 1 to 2 hours, and more preferably for 1 hour, and finally the temperature may be reduced to the ambient temperature. The resultant product of this step (step 108) may be nanoporous graphene along with some impurities.

The activation of impregnated cellulosic materials with the alkali metal hydroxide, generates nanometric pores in the structure of the graphene. The porosity of the nanoporous graphene may be readily controlled by the ratio of alkali metal hydroxide to cellulosic raw materials. In one implementation, the optimal ratio is discussed in more detail in connection with Example 3 hereinbelow.

In the final step of the method 100, the resultant product of the previous step, is washed to remove the impurities from the resultant nanoporous graphene (step 110). The washing process may have two stages, namely, washing the resultant graphene with an acid solution to remove the impurities, and then, washing the resultant graphene with distilled water several times. The graphene, which is purified nanoporous graphene, can then, be filtered and dried. In some implementations, hydrochloric acid (HCl) with a preferred concentration of about 5M, can be used to wash the resultant product, and the subsequent washing with distilled water is carried out to remove the chloride ions. In some implementations, the resultant nanoporous graphene can be washed with an HCl solution, and then in order to remove the chloride ions, the resultant nanoporous graphene is washed with distilled water, and after that, the nanoporous graphene is washed with another acid solution, which could be a nitric acid solution, and finally the purified nanoporous graphene can be rinsed with distilled water.

The aforementioned cellulosic raw materials used in any of the above described implementations, can include walnut, almond, pistachio, kernel palm, bagasse, rice straw, etc.

EXAMPLE 1

In this example, bagasse is used as a cellulosic raw material. The bagasse is washed and ground to achieve a powder with an average particle size of preferably about 320 mesh. Any average particles size in the range of about 100 mesh to about 320 mesh may be suitable. Then, the bagasse powder is placed in a tubular electric furnace, under nitrogen environment. The thermal treatment, which is carried out in the furnace, composes of a heating ramp from the ambient temperature to the final treatment temperature of approximately 900° C., with a heating rate of 5° C. per minute. The aforementioned heating ramp is followed by an approximately 1 hour-long heating at the final treatment temperature. The furnace, is then cooled to the room temperature. After the heating stage is over in the furnace, a black product is obtained. The resultant product is washed, first with a 5M HCl solution to remove impurities, and afterwards it is washed several times with distilled water for the removal of chloride ions. The final product, which is graphene can, then, be filtered and dried overnight (or between 6 and 12 hours) at a temperature of approximately 383 K.

Figure 2:
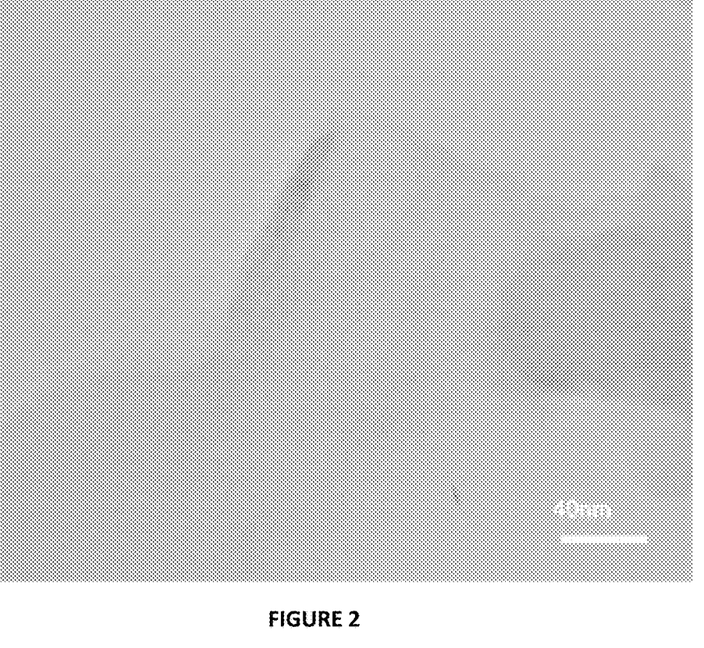
FIG. 2 illustrates transmission electron microscope (TEM) image of the graphene, prepared pursuant to the teachings of the present application, as described in more detail in connection with example 1.

FIG. 2 illustrates a transmission electron microscope (TEM) image of the resultant graphene, prepared via the method described in connection with example 1 hereinabove. As can be seen in this figure, graphene structure is created in the final product. It shows that, metal particles in the bagasse, which is used as a cellulosic raw material, act as a catalyst and help the formation or the growth of the graphene structure.

EXAMPLE 2

In this example, Bagasse powder is prepared by first heating the bagasse under inert atmosphere at a temperature of approximately 600° C., and then, grinding the bagasse to achieve a powder having an average particle size of approximately 320 mesh. The powdered bagasse is then mixed with a 10 wt % saturated Copper (II) hydroxide carbonate solution, while being stirred at a temperature of approximately 100° C. to evaporate the water. Then, the dried mixture is placed in a tubular electric furnace with an inert atmosphere of nitrogen. The thermal treatment includes a first heating ramp from ambient temperature to the final treatment temperature of approximately 900° C., with a heating rate of 5° C. per minute, followed by a 1-hour heating at the final treatment temperature. Finally, the temperature is reduced to the initial ambient temperature. After the heat treatment in the furnace is over, a black product is obtained, which is graphene along with some impurities. About 10 g of the synthesized graphene is added to about 150 mL of an 18 wt % HCl solution and is mixed for about 16 hours at ambient temperature. The resulting mixture is then filtered and washed several times with distilled water until the pH of the filtrate is neutral. After that, the graphene is dissolved in a nitric acid solution with a concentration of about 6 mol $L^{-1}$ for about 3 hours at a temperature of about 70° C., and then, the graphene, which is purified, is washed with distilled water and finally, it is dried at a temperature of about 110° C. for about 12 h.

Figure 3A:
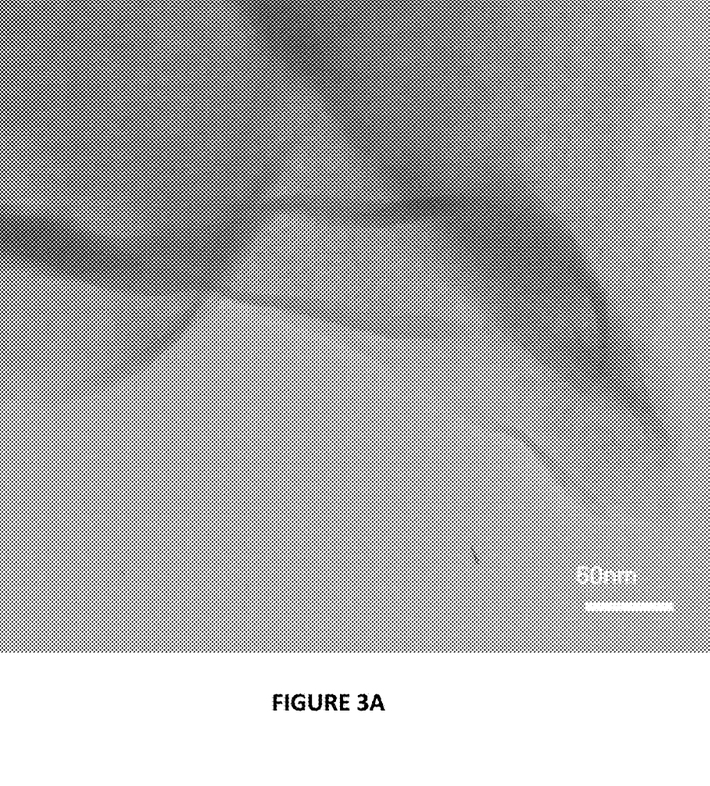
FIG. 3A illustrates TEM images of the graphene, prepared pursuant to the teachings of the present application, as described in more detail in connection with example 2, with image resolutions of 60 nm.
Figure 3B:
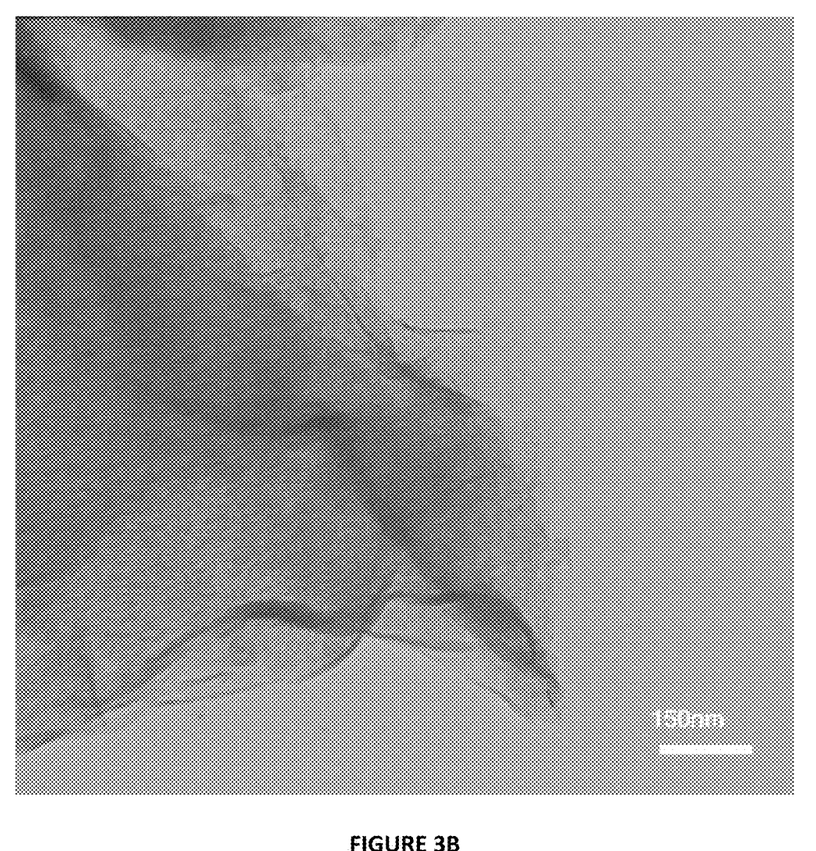
FIG. 3B illustrates TEM images of the graphene, prepared pursuant to the teachings of the present application, as described in more detail in connection with example 2, with image resolution of 150 nm.

FIG. 3 illustrates TEM images of the resultant graphene, prepared via the method described in connection with example 2 hereinabove, with different image resolutions of 60 nm (FIG. 3A) and 150 nm (FIG. 3B). As can be seen in these figures, graphene structure is created in the final product.

EXAMPLE 3

In this example, Bagasse powder is prepared by first heating the bagasse under inert atmosphere at a temperature of approximately 600° C., and then, grinding the bagasse to achieve a powder having an average particle size of approximately 320 mesh. The powdered bagasse is then mixed with a 10 wt % saturated Copper (II) hydroxide carbonate solution, while being stirred at a temperature of approximately 100° C. to evaporate the water. The resultant mixture is then mixed with a saturated KOH solution with a KOH:bagasse mass ratio of about 2.8:1 and the soaking time is approximately 3 hours. After that, the mixture is dried in an oven at a temperature of approximately 80° C., the dried mixture is then placed in a tubular electric furnace under the inert atmosphere of nitrogen. The thermal treatment, which is carried out in the furnace, includes a first heating ramp from ambient temperature to the final treatment temperature of about 850° C. with a heating rate of 5° C. per minute, followed by an approximately 1-hour heating at the final treatment temperature. Then, the temperature is reduced back to the initial ambient temperature. About 10 g of the resultant product is washed with about 150 mL of an 18% HCl solution for about 16 hours at ambient temperature. The resulting mixture is then filtered and washed again with distilled water until the pH of the filtrate is neutral. In second purification step, the filtrate is dissolved in a nitric acid solution with a concentration of about 6 mol $L^{-1}$ for about 3 hours at a temperature of approximately 70° C. and then, the resultant nanoporous graphene, which is purified, is washed with distilled water and finally, it is dried at a temperature of about 110° C. for about 12 h.

Figure 4:
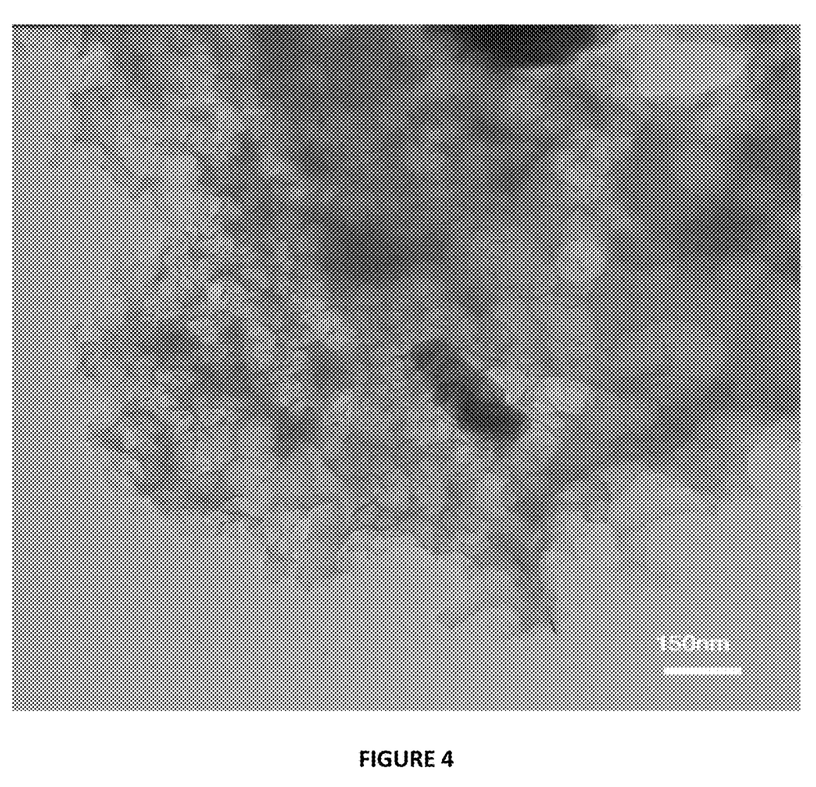
FIG. 4 illustrates TEM image of the nanoporous graphene, prepared pursuant to the teachings of the present application, as described in more detail in connection with example 3.

FIG. 4 illustrates TEM image of the resultant graphene, prepared via the method described in connection with example 3 hereinabove. As can be seen in this figure, nanoporous graphene structure is created in the final product. The morphology of the resultant product, as shown in this figure, is similar to the morphology of a typical nanoporous graphene.

The characteristics of the resultant exemplar graphene, which is produced via the method described in connection with example 2, and the resultant exemplar nanoporous graphene, which is produced via the method described in connection with example 3, are evaluated by measuring the $N_2$ adsorption-desorption isotherms at 77 K. The results are set forth and presented in TABLE 1 hereinbelow. The specific surface area, which is determined by accelerated surface area and porosimetry (ASAP) analysis, is designated by $S_{BET}$.

TABLE 1

Characteristics of the resultant exemplar graphene and nanoporous graphene

| Sample | $S_{BET}$ (m²/g) | Pore volume (cm³/g) | Pore size (nm) |
|---|---|---|---|
| graphene | 462.55 | 0.228 | 1.97 |
| Nano porous graphene | 2719.54 | 1.403 | 2.06 |

The ASAP analysis for the as-prepared nanoporous graphene and as-prepared graphene (hereinafter "samples") was carried out in sub-critical nitrogen at 77.3 K on a Micromeritics American Instrument, which is calibrated using a surface area of a reference material (which, in this case is $Al_2O_3$). Before ASAP measurements, the samples are heated at a temperature of about 30° C. and about 200° C., with a heating rate of 10° C. per minute, for about 30 and about 180 min, respectively. The heating process is carried out under Helium gas flow, with a flow rate of about 40 ml/min in order to remove any adsorbed species. After that, the samples are cooled down to room temperature under Helium flow. Specific surface areas are determined from sub-critical nitrogen isotherms using the well-known Brunauer-Emmett-Teller (BET) theory.

With reference now to TABLE 1, as can be seen in this table the specific surface area of the nanoporous graphene, which is prepared as described in detail in connection with example 3, is significantly higher than that of graphene, which is prepared as described in detail in connection with example 2. High specific surface area makes the nanoporous graphene a suitable candidate for applications, such as hydrogen and natural gas storage.

EXAMPLE 4

In this example, about 1 g of the nanoporous graphene, which is prepared via the method described in more detail in connection with example 3, is placed inside an adsorption column. The adsorption column, which is a small stainless steel vessel, is packed with the as-prepared nanoporous graphene as an adsorption medium. The adsorption column is vacuumed and then, it undergoes the degassing process, all of which are common practices in the art. The empty space in the adsorption column is measured using pure helium. This empty or void space, includes the macro pore volume and the space between the nanoporous particles. The temperature in the column is kept at about 20° C. In this example, the main goal is to determine the adsorption of methane gas at different equilibrium pressures. To this end, a well-known volumetric method is used. In the aforementioned volumetric method, the pressure drop during the adsorption is measured, which is subsequently used to determine the amount of gas adsorbed in the process. The results show that the methane adsorption capacity of the exemplar nanoporous graphene and the exemplar graphene are about 13.7 mmol/g and 4.89 mmol/g, respectively.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A method for producing nanoporous graphene, the method comprising:
    preparing cellulosic raw materials;
    impregnating the prepared cellulosic raw materials with a catalyst;
    activating the impregnated cellulosic raw materials by mixing the impregnated cellulosic raw materials with an alkali metal hydroxide; and
    heating the activated cellulosic raw materials in a heating system to create nanoporous graphene.

2. The method according to claim 1, further comprising washing the nanoporous graphene to remove impurities; and
    filtering and drying the washed nanoporous graphene.

3. The method according to claim 1, wherein preparing the cellulosic raw materials comprising:
    obtaining a powder by grinding the cellulosic raw materials.

4. The method according to claim 3, wherein the powder has an average particle size in a range of 100 mesh to 320 mesh.

5. The method according to claim 1, wherein impregnating the prepared cellulosic raw materials with a catalyst comprising:
    mixing the prepared cellulosic raw materials with the catalyst solution; and
    evaporating water in the mixture of the prepared cellulosic raw materials and the catalyst solution.

6. The method according to claim 1, wherein the catalyst includes:
    metals selected from a group consisting of magnesium (Mg), aluminum (Al), silicon (Si), molybdenum (Mo), tungsten (W), nickel (Ni), copper (Cu), zinc (Zn), titanium (Ti), or mixtures thereof; or
    metal oxides selected from a group consisting of MgO, ZnO, CuO, $SiO_2$, $WO_3$, $MoO_3$, $TiO_2$, or mixtures thereof.

7. The method according to claim 1, wherein the catalyst includes metal salts including metal nitrates, metal acetates, and metal sulfates.

8. The method according to claim 1, wherein the catalyst is selected from a group consisting of copper (II) hydroxide carbonate solution and copper (II) acetate solution.

9. The method according to claim 1, wherein the catalyst is a copper (II) hydroxide carbonate solution with a concentration of 2 to 20 percent by weight.

10. The method according to claim 1, wherein the catalyst is a catalyst solution with a concentration in a range of 2 to 20 percent by weight.

11. The method according to claim 1, wherein activating the impregnated cellulosic raw materials further comprises:
    evaporating water in the mixture of the impregnated cellulosic raw materials and the solution of alkali metal hydroxide.

12. The method according to claim 11, wherein activating the impregnated cellulosic raw materials comprising:
    mixing the impregnated cellulosic raw materials with a powder of an alkali metal hydroxide; and
    heating the mixture of the impregnated cellulosic raw materials and the powder of the alkali metal hydroxide at melting temperature of the alkali metal hydroxide,
    wherein the impregnated cellulosic raw materials are activated by the molten powder of alkali metal hydroxide.

13. The method according to claim 12, wherein the alkali metal hydroxide is KOH.

14. The method according to claim 12, wherein the alkali metal hydroxide is mixed with the impregnated cellulosic raw materials with a ratio in a range of (1 to 1) to (5 to 1) by weight.

15. The method according to claim 1, wherein heating the activated cellulosic raw materials in the heating system comprising:
    heating the activated cellulosic raw materials from ambient temperature to a final treatment temperature with a fixed heating rate under an inert environment;
    heating the activated cellulosic raw materials at the final treatment temperature for a specific amount of time; and
    cooling the heating system back to the ambient temperature.

16. The method according to claim 15, wherein the final treatment temperature is between about 700° C. and about 1100° C.

17. The method according to claim 15, wherein heating at the final treatment temperature is carried out for at least one hour.

18. The method according to claim 15, wherein the fixed heating rate is about 5° C. per minute.

19. The method according to claim 15, wherein the inert environment comprises nitrogen.

20. The method according to claim 1, wherein washing the nanoporous graphene comprising:
    washing the nanoporous graphene with a first acid solution to create a first washed nanoporous graphene;
    washing the first washed nanoporous graphene with distilled water several times to create a second washed nanoporous graphene;
    washing the second washed nanoporous graphene with a second acid solution to create a third washed nanoporous graphene; and
    washing the third washed nanoporous graphene with distilled water several times.

21. The method according to claim 20, wherein:
    the first acid solution is an HCl solution and the second acid solution is a nitric acid solution, and
    the nitric acid solution has a concentration of about 6 mol per liter.

22. The method according to claim 1, wherein the cellulosic raw materials are selected from the group consisting of walnut, almond, pistachio, kernel palm, bagasse, rice straw, or mixtures thereof.

* * * * *